US006876926B2

(12) United States Patent
Kirkland et al.

(10) Patent No.: US 6,876,926 B2
(45) Date of Patent: Apr. 5, 2005

(54) METHOD AND SYSTEM FOR PROCESSING PULSE SIGNALS WITHIN AN INERTIAL NAVIGATION SYSTEM

(75) Inventors: Jeffrey W. Kirkland, Redington Beach, FL (US); Charles P. Eckert, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 53 days.

(21) Appl. No.: 10/255,209

(22) Filed: Sep. 26, 2002

(65) Prior Publication Data

US 2004/0064252 A1 Apr. 1, 2004

(51) Int. Cl.[7] .............................................. G01C 21/26
(52) U.S. Cl. ...................... 701/220; 701/221; 73/178 R; 244/79; 244/177
(58) Field of Search .............................. 73/178 R, 511, 73/504.03, 497, 503.3; 244/75 R, 76 R, 79, 165, 177, 180, 191; 701/220, 221, 217; 600/587, 595; 702/141

(56) References Cited

U.S. PATENT DOCUMENTS

| | | | |
|---|---|---|---|
| 3,936,828 A | 2/1976 | Muesse et al. ............... 342/394 |
| 4,212,443 A | 7/1980 | Duncan et al. .............. 244/177 |
| 5,067,084 A | 11/1981 | Kau ............................ 701/220 |
| 4,470,562 A | 9/1984 | Hall et al. .................... 244/3.2 |
| 4,480,480 A | 11/1984 | Scott et al. .................... 73/769 |
| 4,513,378 A | 4/1985 | Antkowiak .................. 701/217 |
| 4,809,005 A | 2/1989 | Counselman, III .......... 342/352 |
| 4,893,815 A | 1/1990 | Rowan ........................ 463/47.3 |
| 5,281,901 A | 1/1994 | Yardley et al. .............. 318/587 |
| 5,341,130 A | 8/1994 | Yardley et al. .............. 318/587 |
| 5,636,146 A | 6/1997 | Flentov et al. ............... 702/178 |
| 5,650,703 A | 7/1997 | Yardley et al. .............. 318/587 |
| 5,809,457 A | 9/1998 | Yee et al. .................... 701/220 |
| 5,867,804 A | 2/1999 | Pilley et al. ................. 701/120 |
| 5,960,380 A | 9/1999 | Flentov et al. ............... 702/178 |
| 5,977,906 A | 11/1999 | Ameen et al. ............... 342/174 |
| 6,006,158 A | 12/1999 | Pilley et al. ................. 701/120 |
| 6,154,174 A | 11/2000 | Snider et al. ................ 342/371 |
| 6,163,021 A * | 12/2000 | Mickelson ................... 244/3.2 |
| 6,182,005 B1 | 1/2001 | Pilley et al. ................. 701/120 |
| 6,195,609 B1 | 2/2001 | Pilley et al. ................. 701/120 |
| 6,205,400 B1 | 3/2001 | Lin ............................. 701/214 |
| 6,208,414 B1 | 3/2001 | Killpatrick et al. .......... 356/350 |
| 6,266,623 B1 | 7/2001 | Vock et al. ................... 702/44 |
| 6,292,215 B1 | 9/2001 | Vincent ....................... 348/169 |
| 6,313,788 B1 | 11/2001 | Wilson .................. 342/357.11 |
| 6,314,363 B1 | 11/2001 | Pilley et al. ................. 701/210 |
| 6,409,687 B1 * | 6/2002 | Foxlin ......................... 600/595 |
| 6,415,223 B1 | 7/2002 | Lin et al. ..................... 701/208 |
| 6,594,617 B2 * | 7/2003 | Scherzinger ................ 702/160 |
| 6,651,027 B2 * | 11/2003 | McCall et al. .............. 702/141 |
| 2003/0158665 A1 * | 8/2003 | McCall et al. .............. 701/220 |

FOREIGN PATENT DOCUMENTS

WO     WO 02/46699     6/2003

OTHER PUBLICATIONS

International Search Report.

\* cited by examiner

Primary Examiner—Jacques H. Louis-Jacques
(74) Attorney, Agent, or Firm—McDonnell Boehnen Hulbert & Berghoff LLP

(57) ABSTRACT

A method and system for processing pulse signals within an inertial device is provided. The inertial device may have inertial sensors, such as accelerometers and gyroscopes. The inertial sensors may output signals representative of a moving body's motion. The signals may require correction due to imperfections and other errors of the inertial sensors. The inertial device may receive signals from the inertial sensors and process the signals on a signal-by-signal basis so that when processing the signals, the inertial device at least recognizes which sensor output a signal and when the signal was output. The inertial device may then correlate signals that were output from the inertial sensors at selected times in order to transform the signals into a desired navigational frame of reference.

32 Claims, 5 Drawing Sheets

METHOD AND SYSTEM FOR PROCESSING PULSE SIGNALS WITHIN AN INERTIAL NAVIGATION SYSTEM

BACKGROUND

A. Field of Invention

The present invention relates to the field of navigation and, more particularly, to a method and system for processing pulse signals within an inertial navigation system.

B. Description of Related Art

An inertial navigation system typically uses inertial sensors to measure rotational and linear movements without reference to external coordinates. Systems, such as an Inertial Navigation System (INS) and/or an Inertial Measurement Unit (IMU) typically use inertial sensors, such as accelerometers and gyroscopes. An INS is a self-contained box, which provides outputs indicative of position, velocity, attitude, and heading. An INS typically has three accelerometers, and to obtain desired outputs, it is typically necessary to maintain the accelerometers pointing in a north, east, down reference frame (down is a local direction obtained with reference to gravity). The accelerometers within an INS output a signal that is a function of acceleration. Integrating the outputs of the accelerometers produces velocity outputs and integrating again produces position outputs.

Unfortunately, the accelerometers typically have imperfections, resulting in random output errors. Some of the errors are associated with an unstable arrangement of the accelerometers. To maintain the accelerometers in the north, east, and down (or similar orthogonal) reference frame, they may be placed in a gimbaled assembly, and using gyroscopes, the gimbaled assembly may be maintained in this north-east-down frame. However, like the accelerometers, the gyroscopes are typically imperfect, which also results in random errors. In addition, using the gimbaled assembly creates positioning and manufacturing difficulties.

To solve the problems associated with using the gimbaled assembly, the inertial sensors can be securely mounted in place. This results in a "strap-down" system, such as a strap-down INS or a strap-down IMU, which has inertial sensors rigidly fixed (i.e., strapped down) to the chassis of a moving body. Therefore, strap-down systems move with the moving body. Sensors of strap-down systems experience and measure changes in reference to the body's fixed axes instead of the north-east-down reference frame. The body's fixed axes are a moving frame of reference as opposed to a constant inertial frame of reference provided with the gimbaled assembly.

In order to interpret sensor outputs of the strap-down system related to the north-east-down reference frame rather than to the moving body's reference frame, the sensor outputs are transformed mathematically from the moving body's coordinate system to a three-dimensional reference coordinate system. The mathematical transformation allows the strap-down system to function as a gimbaled INS would.

The mathematical transformation is done in a digital computer within the strap-down system, and therefore the strap-down system has limits as to how fast it can repetitively calculate the new reference frames. The computer within the strap-down system may also compensate the sensor outputs to correct for processing errors. The computer accumulates a large group of sensor outputs and then processes the groups of outputs together in order to establish a new reference frame and to correct for processing errors. This results in slow processing due to grouping of outputs. The slow processing causes errors such as coning and sculling to occur due to the slow integration of the inertial signals. For example, the computer will receive outputs from inertial sensors simultaneously and on a continuous basis. Since the computer accumulates outputs prior to processing, the computer will not know the sequence of the outputs that were produced because the computer simply receives a number of signals and processes the signals together as a group. As such, navigation errors will accumulate within the calculated reference frame outputs. Thus, digital computer processing and software based compensation of groups of sensor outputs may not be a practical method of processing inertial sensor outputs for high dynamic conditions.

SUMMARY

In an exemplary embodiment, a method of processing pulse signals within an inertial navigation system is provided. The method includes producing a plurality of first and second signals by inertial sensors and relating a given first signal to a given second signal. The given first signal and the given second signal are related because they were produced at substantially the same time period. For example, signals that were produced within 100 nanoseconds of each other may be matched together. The method further includes processing the given first signal and the given second signal to establish a representation of the given first signal and the given second signal and outputting the representation of the given first signal and the given second signal.

In another respect, an alternate method of processing pulse signals is provided. The method may be performed within an inertial navigation system that has been calibrated to establish known calibration parameters. The method may include receiving a plurality of pulse signals from a known inertial sensor and upon reception of each individual pulse signal of the plurality of pulse signals, processing each pulse signal using the known calibration parameters to establish individually corrected pulse signals. The method may further include accumulating the individually corrected pulse signals to establish respective groups of signals and processing each respective group of signals to establish a representation of the plurality of pulse signals from the known inertial sensor. The method may also include outputting an indication of the representation of the plurality of pulse signals.

In still another respect, the exemplary embodiment may take the form of a navigation system. The system may include a plurality of inertial sensors that may output a plurality of pulse signals. The system may also include a processor coupled to the plurality of inertial sensors. The processor may receive the plurality of pulse signals, and upon reception of each individual pulse signal of the plurality of pulse signals, the processor may individually process each pulse signal of the plurality of pulse signals using predetermined calibration parameters to establish individually corrected pulse signals. The processor may then process the individually corrected pulse signals to establish a representation of the plurality of pulse signals from the plurality of inertial sensors.

In yet another respect, the exemplary embodiment may take the form of a processor within a navigation system that has a plurality of inertial sensors that may output a plurality of pulse signals. The processor may include a compensator coupled to the plurality of inertial sensors. The compensator may receive the plurality of pulse signals and calibrate the plurality of pulse signals to establish calibrated pulse signals. The processor may also include an accumulator coupled to the compensator. The accumulator may correlate signals within the calibrated pulse signals that were output from the plurality of inertial sensors at substantially the same time. The processor may also include an integrator coupled to the accumulator. The integrator may process the correlated signals to transform the correlated signals into a desired navigational frame of reference.

These as well as other features and advantages will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

In an exemplary embodiment, inertial sensor outputs within an inertial navigation system may be processed to correct for possible distorted measurements due to environmental conditions, or from other sources. The correction may be completed on a signal-by-signal basis. As the inertial sensor outputs a signal, the signal may be corrected with respect to known calibration parameters of the system, rather than corrected with respect to other signals. In addition, outputs of rotational and acceleration sensors may be correlated on a signal-by-signal basis to allow the outputs to be transformed into a desired frame of reference corresponding to a correlated time period. The signal-by-signal correction and correlation may reduce and/or eliminate coning and sculling errors (i.e., errors associated with grouping signals for correction) that exist within typical systems.

Figure 1:
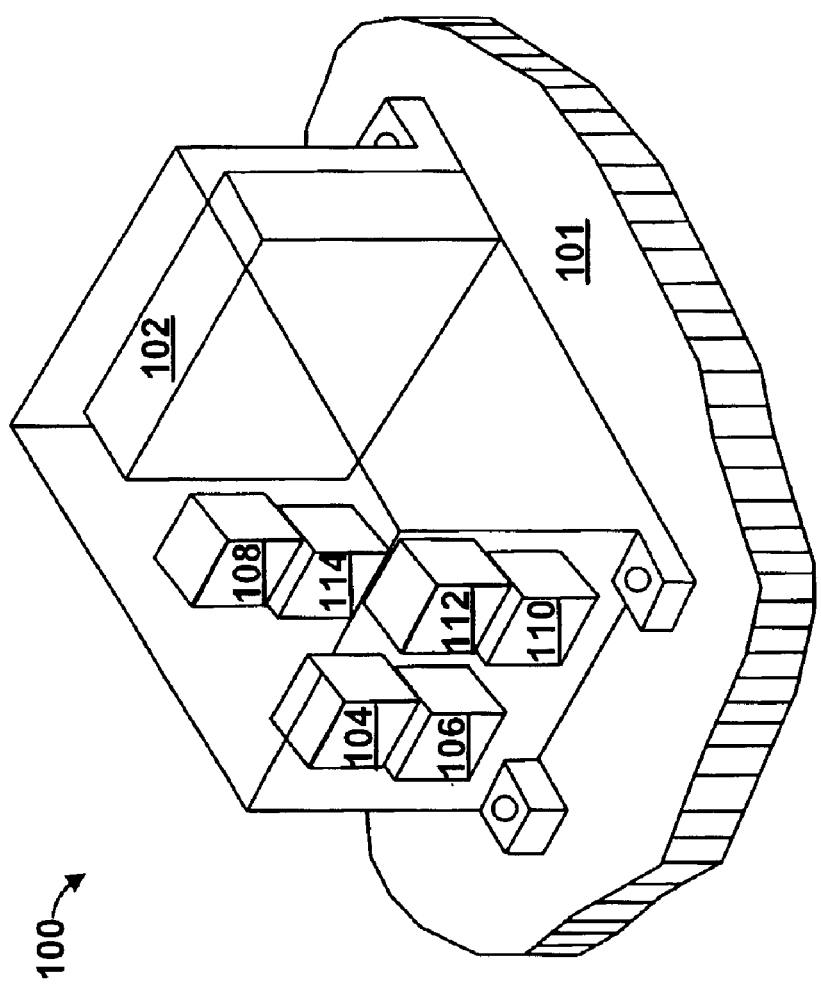
FIG. 1 illustrates one embodiment of an inertial navigation system.

Referring now to FIG. 1, one embodiment of an inertial navigation system 100 is illustrated. While FIG. 1 illustrates an INS, other systems may achieve advantages of the present invention as well. For example, an IMU may be implemented and/or any inertial navigation system for use within systems and vehicles whether on land, in or on the ocean, in the atmosphere, or in space in the vicinity of the Earth may also be implemented according to the present invention.

By way of example, system 100 is illustrated mounted to a surface 101 of a moving body, such as a satellite for instance. The system 100 includes a processing unit 102, gyroscopes 104, 106, and 108, and accelerometers 110, 112, and 114. The gyroscopes 104, 106, and 108 and accelerometers 110, 112, and 114 are each secured to the processing unit 102. Other inertial sensors may also be included in the system 100. It should be understood that the system 100 illustrated in FIG. 1 and other arrangements described herein are set forth for purposes of example only, and other arrangements and elements can be used instead and some elements may be omitted altogether, depending on manufacturing and/or consumer preferences.

Gyroscopes 104, 106, and 108, and accelerometers 110, 112, and 114 within the system 100 may each be sensitive to only one axis of motion. The system 100 may be configured so that gyroscopes 104, 106, and 108 are mutually orthogonal, and so that accelerometers 110, 112, and 114 are also mutually orthogonal. This configuration allows for the system 100 to be sensitive to six degrees of freedom of motion (i.e., three translational and three rotational). In another embodiment, rotation may be measured inertially without gyroscopes, using differential linear acceleration measurements output by two or more accelerometers undergoing the same rotational motion, but located at different distances from the center of rotation.

The system 100 may initially require calibration and alignment due to imperfections of the system 100 resulting from manufacturing limitations. For example, inertial sensors can have output errors due to temperature, rotation rate, acceleration effects, and other sources as well.

In addition, the system 100 may require calibration to correct for improper measurements. As an example, accelerometers sense acceleration due to rotation about a point. However, rotation about a point will produce an additional centripetal acceleration vector. The centripetal acceleration vector can be compensated for by using a gyroscope's output and calculating a distance between the accelerometer and the point. This compensation is referred to as "size effect." Similarly, a gyroscope's output may be affected by linear acceleration, which can be compensated for using accelerometers. This compensation is referred to as "G sensitivity."

The system 100 may be calibrated by initially operating the system 100 under various conditions and environments. For example, the system 100 may be operated at a series of different temperatures, and the outputs of the gyroscopes 104, 106, and 108, and accelerometers 110, 112, and 114 can be recorded at each temperature. The system 100 may also be exposed to varied forces and the outputs of the gyroscopes 104, 106, and 108, and accelerometers 110, 112, and 114 may be recorded at each interval of the forces. The recorded outputs may be arranged in a table format and/or any other suitable format, such that the system 100 may consult these outputs to establish default settings, for example.

Calibration parameters may be established using the recorded outputs. For example, a scale factor calibration parameter may be established to correct scaling errors. Scaling errors are a linear deviation of a measured rate from the true rate; as the exterior force is increased on the system 100, the inertial sensor outputs may be amplified or attenuated. In addition, an "asymmetry" error may be present due to unbalanced positive and negative values of the sensor outputs, which may also be corrected using the scaling factor.

Sensor drift calibration parameters may also be established. For example, gyroscope and accelerometer drift errors can be corrected by utilizing other system states. Angular drift errors of a gyroscope can be compensated by comparing angular measurements of a gyroscope with reference to the moving body to angular measurements of the moving body with reference to the Earth. Additionally, since inertial systems are generally operated around an equilibrium position, then measurements, such as attitude heading measurements, can be processed via gravitational acceleration, thus giving true angular measurements to compensate gyroscope drift.

A bias calibration parameter can also be established, which is used to correct the offset output error of individual sensors. A gyroscope bias may for instance, appear as angular drift, such as an increasing rise in angular velocity and acceleration over time. The bias calibration parameter can reset the gyroscope output to a correct offset according to the initial calibration testing. Other calibration parameters may also be established such as a misalignment parameter, a non-orthogonality parameter, a mass imbalance parameter, and other dynamic and temperature related calibration parameters.

The calibration parameters may be stored within data storage in the processing unit 102 of the system 100. Alternatively, the calibration parameters may be stored within other data storage (not illustrated) in the system 100. The data storage may be any permanent or non-volatile data storage means, such as magnetic disks, optical disks, solid-state memory, or any other mass storage system readable by the processing unit 102. More than one data storage may be included within the system 100.

Calibration parameters allow for correctly interpreting outputs of the gyroscopes 104, 106, and 108, and accelerometers 110, 112, and 114. Alignment parameters may also be established to provide a direction of an input axis to each of the gyroscopes 104, 106, and 108, and accelerometers 110, 112, and 114 at the start of recording measurements.

Alignment of the inertial sensors can also require correction. This compensation may line up the gyroscopes 104, 106, and 108 and accelerometers 110, 112, and 114 axes into an orthogonal triad (i.e., 3 axes each 90 about degrees apart). An angle error in the triad may be present. An angle error (or a "non-orthogonality" error), applies to both the accelerometer and gyroscope triads. Additional compensation may also be necessary to align the accelerometer orthogonal triad to the gyroscope orthogonal triad to make the triads coincident. Alignment error is referred to as accelerometer to gyroscope misalignment.

The calibration of the system 100 allows for the system 100 to be manufactured at a reduced cost. Using calibration parameters to correct the outputs of the gyroscopes 104, 106, and 108, and the accelerometers 110, 112, and 114, painstaking efforts in manufacturing of the system 100 to obtain extremely precise outputs of these inertial sensors may not be necessary. In addition, calibrating a system as described allows the inertial sensor's outputs to be corrected specifically for each unique system. In this manner, the system 100 may be manufactured using generic inertial sensors, and calibrated to normalize the outputs.

The system 100 may also need to be initialized, to supply initial values of position and velocity at the start of recording measurements with reference to a coordinate system. Initial position may be obtained from a previous geodetic survey or, for example, from a Global Positioning System (GPS). Multiple initializations may be necessary for multiple coordinate systems such as any of Earth-Centered Inertial (ECI) axes, Earth-Centered Earth-Fixed (ECEF) axes, Local Geodetic Vertical (LGV) axes, Local Geocentric Vertical (LGCV) axes, Local Astronomic Vertical (LAV) axes, Vehicle Body (VB) axes, Star Line-of-Sight (SLS) axes, and other desired coordinate systems.

The system 100 illustrated in FIG. 1 may be used in navigation systems for aircraft, land vehicles, marine vehicles, or space vehicles. It may also be used underground for drilling and pipe inspections. The system 100 may also be used to stabilize systems. For example, the system 100 may be used to stabilize a camera mounted on a helicopter. For a more complete understanding of inertial navigation systems, reference is made to: "Fundamentals of High Accuracy Inertial Navigation," by Averil B. Chatfield, Progress in Astronautics and Aeronautics, Vol. 174, pg. 5.

Figure 2:
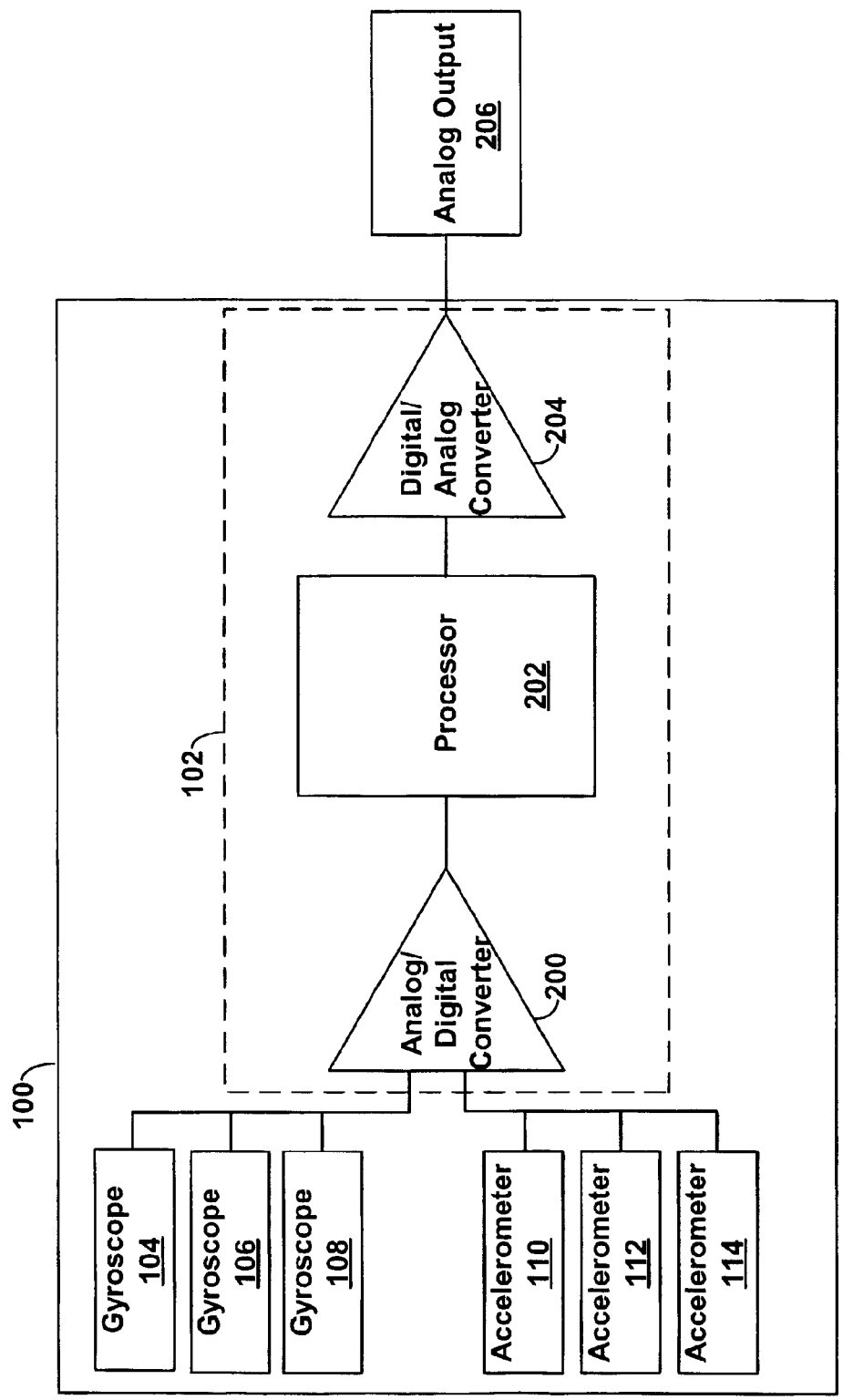
FIG. 2 is a block diagram illustrating the inertial navigation system of FIG. 1.

FIG. 2 is a block diagram of the system 100. As shown, the processing unit 102 may include an analog/digital converter 200, a processor 202, and a digital/analog converter 204. Additional elements may be included as well. For example, processing unit 102 may include a data storage medium. The system 100 also includes an analog output 206, and may include other desired outputs as well.

The processor 202 may be any processor, such as a digital signal processor, and may comprise one or more processing units. The processor 202 may also be combinational logic such as a field programmable gate array (FPGA). The processor 202 may be operable to execute machine language instructions in order to manipulate signals received from the gyroscope 104 and the accelerometer 110.

The analog/digital converter 200 converts analog input signals into a digital form (i.e., electrical impulses translated into "1's" and "0's"). The digital/analog converter 204 converts digital signals output from the processor 202 into analog signals.

The system 100 may determine position and orientation of a moving body using outputs of the gyroscopes 104, 106, 108 and accelerometers 110, 112, 114 in the kinematics equations for translational and rotational motion. The accelerometers 110, 112, and 114 output signals representative of acceleration. The outputs of the accelerometers 110, 112, and 114 may be integrated once to obtain velocity measurements. The outputs of the accelerometers 110, 112, and 114 may be integrated twice to obtain position measurements. The translational kinematics representation given by Equation 1 provided below represents the position measurements.

$$x = x_0 + v_0 t + \frac{1}{2} a t^2 \quad \text{(Eq. 1)}$$

(Where x is position, $x_0$ is initial position, $v_0$ is initial velocity, t is time, and a is acceleration, the output of an accelerometer.)

The outputs of the gyroscopes 106, 106, and 108 may represent a rotational rate of the system 100. The orientation of an object, given a sensed rotational rate, ω, during each time step, t, is given by Equation 2 provided below.

$$\theta = \theta_0 + \omega t \quad \text{(Eq. 2)}$$

(Where θ is the orientation angle, $\theta_0$ is an initial orientation angle, and t is the time step.)

In existing inertial sensor systems, a processing unit receives outputs from inertial sensors simultaneously and on a continuous basis. The processing unit accumulates the outputs into groups of outputs and then processes the groups to obtain translation and rotational outputs. Since the processing unit accumulates outputs prior to processing, the processing unit does not know the sequence of the outputs that were produced or from what sensor the outputs were produced because the processing unit simply receives a number of signals and processes the signals as a group. The processing unit does not distinguish the between gyroscope outputs or between accelerometer outputs. As such, processing errors will result due to the accumulation of the outputs. For example, a coning error results in accumulating outputs from gyroscopes and a sculling error results from accumulating outputs from accelerometers due to an unknown origination of the outputs. These errors are reflected in an improperly calculated navigation frame of reference of the acceleration outputs since the acceleration outputs may have been transformed into a frame of reference according to gyroscope outputs of a different time period because the processing unit groups signals together over an arbitrary time period.

In addition, since the processing unit does not exactly know what sensor output the particular output signals, it is difficult to maintain the accelerometer's outputs in the north, east, and down (or similar orthogonal) reference frame, since the accelerometer's outputs are kept in a proper reference frame using the gyroscope's outputs. And since the gyroscope's output signals may not be correlated with the accelerometers output signals, due to the mass grouping of signals, the reference frame for a particular group of accelerometer outputs may be improperly calculated (or at least not exactly calculated) from outputs of a gyroscope that correspond to other groups of accelerometer outputs.

In an exemplary embodiment, within the system 100, the processing unit 102 receives outputs from the gyroscopes 104, 106, and 108 and accelerometers 110, 112, and 114, and processes the signals when received. The signals may not be accumulated prior to processing, but may instead be individually processed. Therefore, coning and sculling errors may be reduced and/or eliminated within the system 100 because the processing unit 102 may determine which sensor produced a particular signal. And, therefore, the processing unit 102 may properly correlate accelerometer and gyroscope outputs together so that a proper frame of reference may be calculated.

Figure 3:
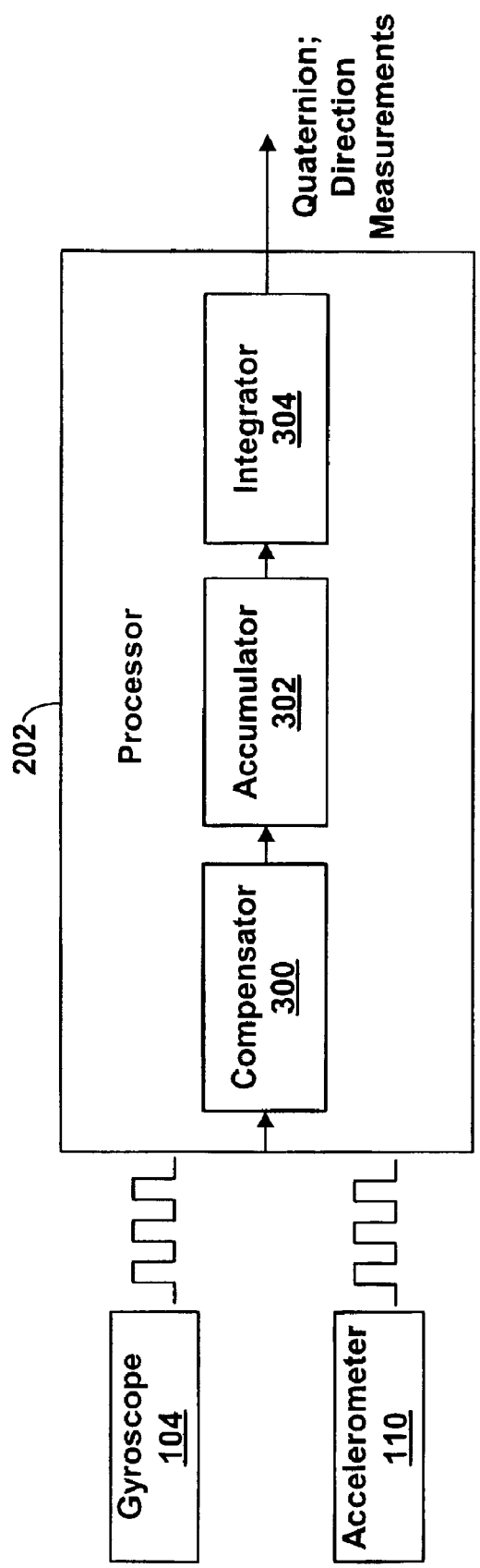
FIG. 3 is a block diagram illustrating one embodiment of a portion of the inertial navigation system of FIG. 1.

FIG. 3 is a block diagram of the processor 202. The gyroscopes and accelerometers of the system 100, such as gyroscope 104 and accelerometer 110, may output signals as pulses or a pulse train to the processor 202. The pulse signals may first be converted to digital signals and then input into the processor 202. The processor 202 includes a compensator 300, an accumulator 302, and an integrator 304.

The compensator 300 may be the first stage of the processor 202. The output pulse signals may be corrected using the known calibration parameters established during initial testing and calibration of the system 100. For example, the outputs of the accelerometer 110 can be corrected for attenuation or amplification by multiplying the outputs by the known scaling factor calibration parameters. In addition, the outputs can be corrected for improper time offsets by using the bias calibration parameters to reset the outputs to a proper time reference. Other corrections may be made, such as correcting a set of three outputs for orthogonality. The compensator 300 may only correct sensor outputs for one of these conditions. Alternatively, the compensator 300 can correct the sensor outputs according to all of the calibration parameters established.

The compensator 300 may process signals from gyroscope 104 and from accelerometer 110 simultaneously. The compensator 300 may receive signals serially and output them serially as well. The compensator 300 may output corrected signals to the accumulator 302.

The compensator 300 may receive the signals from the gyroscope 104 and from the accelerometer 110 simultaneously and process them independently to correct each individual signal to establish corrected signals. The compensator 300 can process the signals upon reception of the signals, rather than accumulating a group of signals prior to processing them.

The accumulator 302 collects signals and establishes groups of signals. The accumulator 302 may establish the groups of signals in any amounts as desired. The accumulator 302 may be a logical register or any other type of volatile or non-volatile memory device. The accumulator 302 may also correlate sensor outputs. For example, the accumulator 302 may receive gyroscope and accelerometer signals simultaneously because the gyroscope 104 and the accelerometer 110 output signals simultaneously. The gyroscope's outputs at a specific time may need to be referenced to the accelerometer's outputs at that specific time so that the accelerometer's outputs may be transformed into a specific time frame of reference based on the gyroscope's outputs. The accumulator 302 may match gyroscope 104 and accelerometer 110 signals together that were output at a specific time or during a time period. In this manner, outputs of the gyroscope 104 and the accelerometer 110 that were produced at the same time may be matched together.

The accumulator 302 may match the gyroscope's 104 output to an output of the accelerometer 110 which was produced at substantially the same time period. For example, an output of the gyroscope 104 may be matched to an output of the accelerometer 110 that was produced within 100 nanoseconds of when the output was produced by the gyroscope 104. A buffer time period may be established such that gyroscope outputs produced with the buffer time period of accelerometer outputs should be matched together in order to be able to transform the accelerometer outputs into a proper frame of reference. The buffer time period may be dependent upon the rate at which the gyroscope and accelerometer produce outputs, the need for precise accuracy of the transformed frame of reference, and the processing speed of other components of the processor 202. In some instances, the buffer time period may be as long as a thousandth of a second. However, the buffer time period may also be on the order of picoseconds, for very precise measurements. Other time periods are possible as well.

In effect, the accumulator 302 may match or relate a first signal to a second signal, such that the first signal and the second signal were produced at the same time, and also such that the first signal represents a rotational measurement and the second signal represents an acceleration measurement. The accumulator 302 may then output the matched signals to the integrator 304.

The integrator 304 may process the groups of signals, or matched signals, to produce position, velocity, heading, attitude, and other information of the moving body. The integrator 304 may also process a group of signals to transform the signals into a proper reference frame since the gyroscope 104 signals and the accelerometer 110 signals are sufficiently matched. Therefore, the accelerometer 110 outputs may be transformed into a reference frame corresponding to the time that the accelerometer 110 outputs were produced because the accelerometer 110 outputs will be transformed into a desired reference frame according to gyroscope 104 outputs that were produced at the same time (contrast with existing systems where accelerometer 110 outputs are transformed according to gyroscope outputs that have been accumulated, so it is unknown what gyroscope outputs correspond to these particular accelerometer outputs).

The integrator 304 may process the accelerometer 110 and gyroscope 104 signals to produce a navigational reference frame, such as a Quaternion. Other frames of reference may be calculated as well such as a reference frame corresponding to ECI axes, LGV axes, VB axes, or others. In addition, the integrator 304 may process the accelerometer 110 and gyroscope 104 signals to produce other representations of these signals as well.

A Quaternion (q) is a quadruple (4 element) matrix that is a representation of a navigation frame in space consisting of a real scalar part ($q_3$) and a hyper-imaginary 3-vector part ($q_0$, $q_1$, $q_2$) as defined in Equation 3 shown below.

$$q = q_3 + iq_0 + jq_1 + kq_2 \quad \text{(Eq. 3)}$$

(Where: $i^2 = j^2 = k^2 = ijk = -1$; and $ij = -ji = k$; and $jk = -kj = i$.)

A 3-by-3 direction cosine matrix (DCM) transformation of the sensor outputs produces the Quaternion. A group of four inertial sensor outputs may comprise a Quaternion vector, which is the four-element vector ($q_0, q_1, q_2, q_3$). The DCM performs the coordinate transformation of the sensor outputs with reference to the moving body into a north-east-down reference frame.

The DCM is defined as a function of a unit quaternion vector by the following matrix.

$$DCM = \begin{bmatrix} (q_0^2 + q_1^2 - q_2^2 - q_3^2) & 2(q_1q_2 + q_0q_3) & 2(q_1q_3 - q_0q_2) \\ 2(q_1q_2 - q_0q_3) & (q_0^2 - q_1^2 + q_2^2 - q_3^2) & 2(q_2q_3 + q_0q_1) \\ 2(q_1q_3 + q_0q_2) & 2(q_2q_3 - q_0q_1) & (q_0^2 - q_1^2 - q_2^2 + q_3^2) \end{bmatrix}$$

The Quaternion may be transformed to a set of Euler angles to determine a yaw (i.e., side to side movement), a pitch (i.e., up and down movement), and a roll rotation (i.e., revolution about a longitudinal axis) of the moving body as shown below in Equations 4–7.

$$q_0 = \left[\cos\left(\frac{yaw}{2}\right)\cos\left(\frac{pitch}{2}\right)\sin\left(\frac{roll}{2}\right)\right] - \left[\sin\left(\frac{yaw}{2}\right)\sin\left(\frac{pitch}{2}\right)\cos\left(\frac{roll}{2}\right)\right] \quad \text{(Eq. 4)}$$

$$q_1 = \left[\cos\left(\frac{yaw}{2}\right)\sin\left(\frac{pitch}{2}\right)\cos\left(\frac{roll}{2}\right)\right] + \left[\sin\left(\frac{yaw}{2}\right)\cos\left(\frac{pitch}{2}\right)\sin\left(\frac{roll}{2}\right)\right] \quad \text{(Eq. 5)}$$

$$q_2 = \left[\sin\left(\frac{yaw}{2}\right)\cos\left(\frac{pitch}{2}\right)\cos\left(\frac{roll}{2}\right)\right] - \left[\cos\left(\frac{yaw}{2}\right)\sin\left(\frac{pitch}{2}\right)\sin\left(\frac{roll}{2}\right)\right] \quad \text{(Eq. 6)}$$

$$q_3 = \left[\cos\left(\frac{yaw}{2}\right)\cos\left(\frac{pitch}{2}\right)\cos\left(\frac{roll}{2}\right)\right] + \left[\sin\left(\frac{yaw}{2}\right)\sin\left(\frac{pitch}{2}\right)\sin\left(\frac{roll}{2}\right)\right] \quad \text{(Eq. 7)}$$

Euler angles can be extracted from the Quaternion DCM as follows below in Equations 8–10.

$$\tan(yaw) = \frac{2(q_2q_3 + q_0q_1)}{(q_0^2 - q_1^2 - q_2^2 + q_3^2)} \quad \text{(Eq. 8)}$$

$$\sin(pitch) = 2(q_1q_3 + q_0q_2) \quad \text{(Eq. 9)}$$

$$\tan(roll) = \frac{2(q_1q_2 + q_0q_3)}{(q_0^2 - q_1^2 + q_2^2 - q_3^2)} \quad \text{(Eq. 10)}$$

The Quaternion may be used to interpret the yaw, pitch, and roll rotation of the moving body using Equations 8, 9, and 10. The integrator 304 may also process the groups of signals to produce output signals in other desired formats as well.

Figure 4:
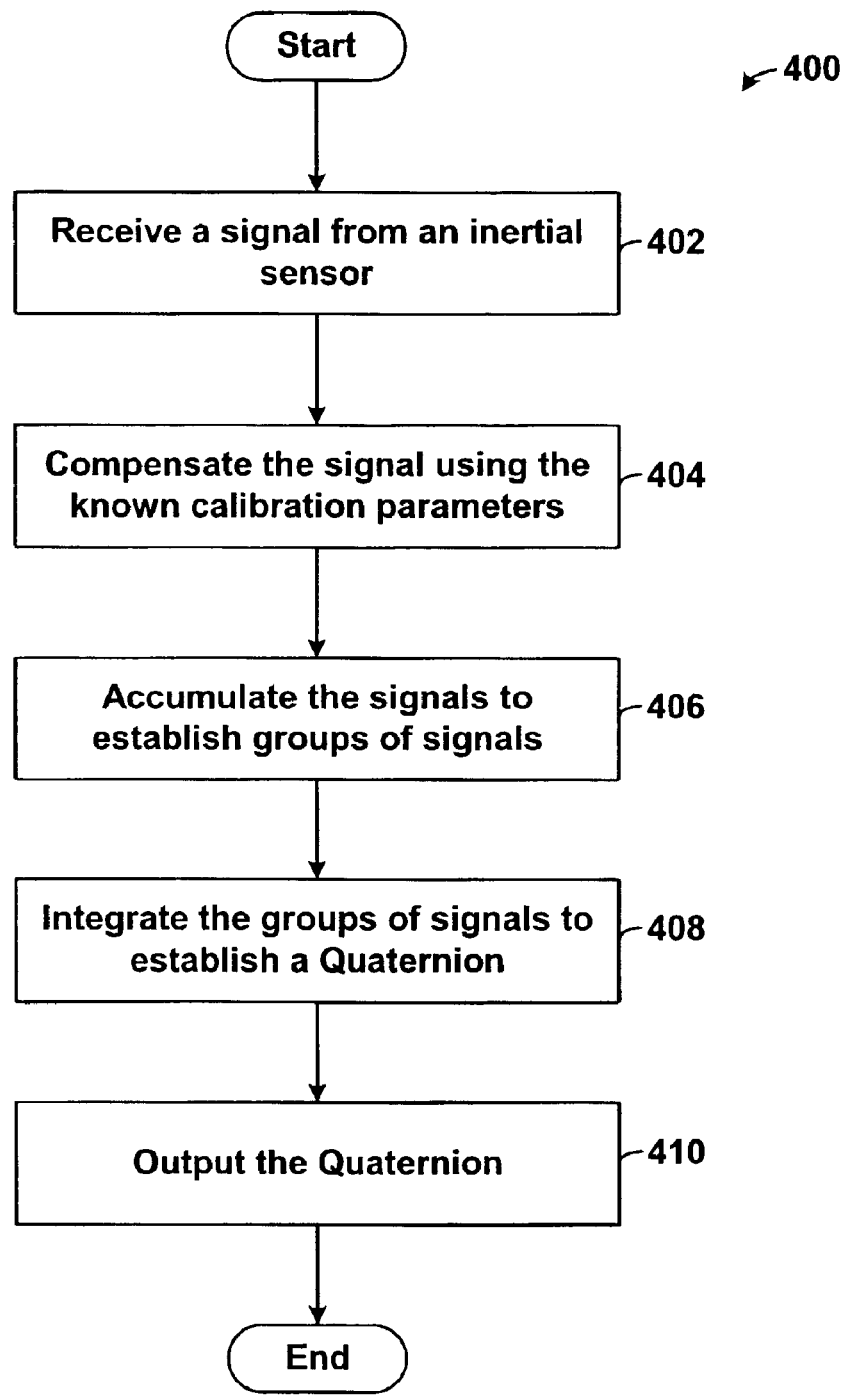
FIG. 4 is a flowchart depicting functional blocks of a method according to one embodiment.

FIG. 4 is a flowchart depicting functional blocks of a method 400 for processing inertial sensor outputs. Initially, as shown at block 402, a signal is received at processor 202 from an inertial sensor. The signal is compensated using the known calibration parameters, as shown at block 404. After compensating a number of signals, the signals are accumulated (or matched) to establish groups of signals, as shown at block 406. The groups of signals are integrated to establish a Quaternion (or other output), as shown at block 408, and the Quaternion is output by the processor 202, as shown at block 410.

Figure 5:
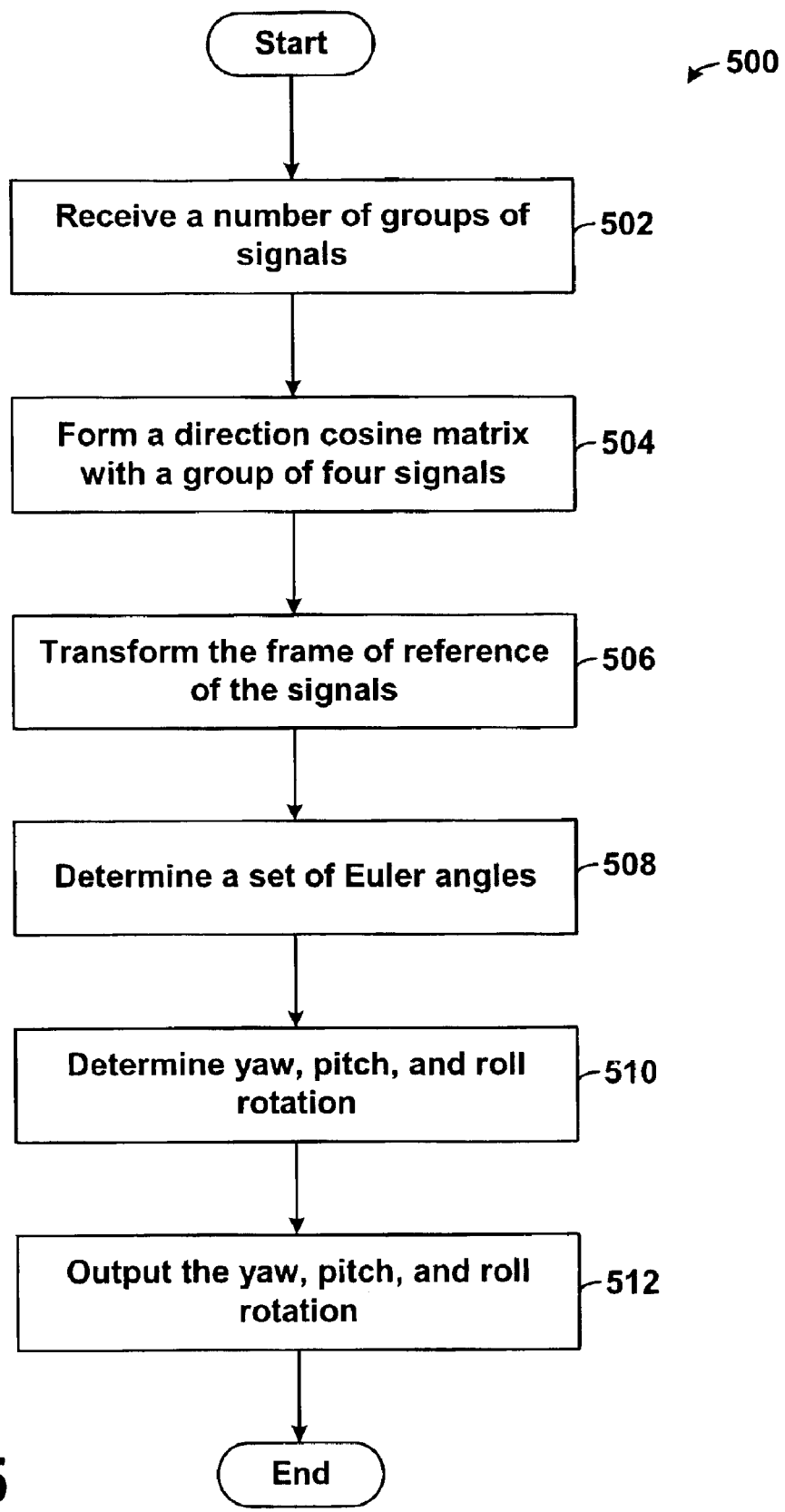
FIG. 5 is another flowchart depicting functional blocks of a method according to one embodiment.

FIG. 5 is a flowchart depicting functional blocks of a method 500 for establishing Quaternion and navigational outputs. Initially, as shown at block 502, groups of signals are received into the integrator 304. A DCM is formed with a group of four signals, as shown at block 504. The frame of reference of the signals is then transformed into a north-east-down reference, as shown at block 506. A set of Euler angles is determined from the DCM, as shown at block 508. The yaw, pitch, and roll rotation of the moving body can be determined from the Euler angles, as shown at block 510, and the yaw, pitch, and roll rotation are then output by the integrator 304, as shown at block 512.

While the invention has been described in conjunction with presently preferred embodiments of the invention, persons of skill in the art will appreciate that variations may be made without departure from the scope and spirit of the invention. This true scope and spirit is defined by the appended claims, which may be interpreted in light of the foregoing.

We claim:

1. In an inertial navigation system, a method comprising:
producing a plurality of first and second signals by inertial sensors;
relating a given first signal to a given second signal, wherein the given first signal and the given second signal were produced at substantially the same time period;
processing the given first signal and the given second signal so as to establish a representation of the given first signal and the given second signal; and
outputting the representation of the given first signal and the given second signal.

2. The method of claim 1, wherein producing the plurality of first and second signals by inertial sensors comprises producing rotational and acceleration signals by the inertial sensors.

3. The method of claim 2, wherein relating the given first signal to the given second signal comprises matching a given rotational signal with a given acceleration signal so as to establish a set of rotational and acceleration signals, wherein the set of rotational and acceleration signals comprises rotational and acceleration signals that were produced at substantially the same time.

4. The method of claim 3, wherein processing the given first signal and the given second signal comprises processing the set of rotational and acceleration signals so as to establish a representation of the set of rotational and acceleration signals, thereby reducing coning and sculling errors within the representation of the set of rotational and acceleration signals.

5. The method of claim 1, wherein relating the given first signal to the given second signal comprises matching together a signal produced within a buffer time period of another signal.

6. The method of claim 1, wherein processing the given first signal and the given second signal comprises transforming the given second signal into a frame of reference based on the given first signal.

7. The method of claim 1, wherein the inertial navigation system has been calibrated so as to establish known calibration parameters.

8. The method of claim 7, further comprising independently processing the given first signal and the given second signal using the known calibration parameters so as to establish corrected first and second signals.

9. The method of claim 8, wherein independently processing the given first signal and the given second signal using the known calibration parameters comprises multiplying the given first signal and the given second signal by the known calibration parameters.

10. The method of claim 8, wherein independently processing the given first signal and the given second signal comprises correcting the given first signal and the given second signal for errors selected from the group consisting of scaling factor errors, bias errors, and asymmetry errors.

11. In an inertial navigation system that has been calibrated so as to establish known calibration parameters, a method comprising:
receiving a plurality of pulse signals from a known inertial sensor;
upon reception of each individual pulse signal of the plurality of pulse signals, processing each pulse signal using the known calibration parameters so as to establish individually corrected pulse signals;
accumulating the individually corrected pulse signals so as to establish respective groups of signals;
processing each respective group of signals so as to establish a representation of the plurality of pulse signals from the known inertial sensor; and
outputting an indication of the representation of the plurality of pulse signals.

12. The method of claim 11, wherein processing each pulse signal using the known calibration parameters so as to establish the individually corrected pulse signals comprises processing each signal of the plurality of signals independent of each other.

13. The method of claim 11, wherein accumulating the individually corrected pulse signals so as to establish the respective groups of signals comprises relating a given first signal of the corrected pulse signals to a given second signal of the corrected pulse signals, wherein the given first signal and the given second signal were produced at substantially the same time period.

14. The method of claim 11, wherein outputting the indication of the representation of the plurality of pulse signals comprises outputting information selected from the group consisting of a yaw, a pitch, and a roll rotation of the inertial navigation system.

15. The method of claim 11, wherein processing each group of signals so as to establish the representation of the plurality of pulse signals comprises establishing a Quaternion output.

16. The method of claim 15, wherein establishing the Quaternion output comprises forming a direction cosine matrix (DCM) with the respective groups of signals.

17. The method of claim 15, wherein establishing the Quaternion output comprises transforming a frame of reference of the respective groups of signals.

18. The method of claim 15, wherein establishing the Quaternion output comprises determining a set of Euler angles.

19. The method of claim 18, wherein determining the set of Euler angles comprises determining a yaw, a pitch, and a roll rotation of the inertial navigation system.

20. A navigation system comprising:
a plurality of inertial sensors operable to output a plurality of pulse signals; and
a processor coupled to the plurality of inertial sensors, the processor operable to receive the plurality of pulse signals,
wherein upon reception of each individual pulse signal of the plurality of pulse signals, the processor individually processes each pulse signal of the plurality of pulse signals using predetermined calibration parameters so as to establish individually corrected pulse signals, and wherein the processor processes the individually corrected pulse signals so as to establish a representation of the plurality of pulse signals from the plurality of inertial sensors.

21. The navigation system of claim 20, wherein the processor relates each of the plurality of pulse signals with at least one of the plurality of inertial sensors.

22. The navigation system of claim 20, wherein the at least one inertial sensor is a sensor selected from the group consisting of a gyroscope and an accelerometer.

23. The navigation system of claim 20, wherein the processor comprises a field programmable gate array (FPGA).

24. The navigation system of claim 20, wherein the processor processes the individually corrected pulse signals by placing the individually correct pulse signals into groups of signals and processing the groups of signals.

25. The navigation system of claim 20, wherein the representation of the plurality of pulse signals from the at least one inertial sensor is selected from the group consisting of a yaw of the system, a pitch of the system, a roll rotation of the system, a Quaternion output, and a set of Euler angles.

26. The navigation system of claim 20, wherein the processor comprises:
a compensator being operable to individually process each pulse signal of the plurality of pulse signals using the predetermined calibration parameters so as to establish the individually corrected pulse signals;
an accumulator coupled to the compensator, the accumulator being operable to collect the individually corrected pulse signals so as to establish groups of signals; and
an integrator coupled to the accumulator, the integrator being operable to process the groups of signals so as to establish the representation of the plurality of pulse signals from the plurality of inertial sensors.

27. The navigation system of claim 26, wherein the compensator individually processes each pulse signal of the plurality of pulse signals independent of each other.

28. In a navigation system having a plurality of inertial sensors operable to output a plurality of pulse signals, a processor comprising:
a compensator coupled to the plurality of inertial sensors, the compensator operable to receive the plurality of pulse signals and to calibrate the plurality of pulse signals so as to establish calibrated pulse signals;
an accumulator coupled to the compensator, the accumulator operable to correlate signals within the calibrated pulse signals that were output from the plurality of inertial sensors at substantially the same time; and
an integrator coupled to the accumulator, the integrator operable to process the correlated signals so as to transform the correlated signals into a navigational frame of reference.

29. The processor of claim 28, wherein the accumulator matches a rotational signal from the calibrated pulse signals with an acceleration signal from the calibrated pulse signals, wherein the rotational signal and the acceleration signal were output from the plurality of inertial sensors at substantially the same time.

30. The processor of claim 29, wherein the integrator transforms the acceleration signal into the navigational frame of reference of the navigation system at a time reference when one of the plurality of inertial sensors output the rotational signal.

31. The processor of claim 28, wherein the integrator processes the correlated signals to produce navigational parameters selected from the group consisting of position, velocity, heading, and attitude parameters of the navigation system.

32. The processor of claim 28, wherein the processor executes machine language instructions to perform functions of the compensator, the accumulator, and the integrator.

* * * * *